(12) United States Patent
Bulgakov et al.

(10) Patent No.: US 7,745,563 B2
(45) Date of Patent: *Jun. 29, 2010

(54) METHOD FOR PROCESSING POLYESTER WASTE

(75) Inventors: Viktor Bulgakov, Puschino (RU); Levan Dadiani, Boleslav (CZ); George Javakhishvili, Tbilisi (GE)

(73) Assignee: PTP Group Ltd., Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 12/350,529

(22) Filed: Jan. 8, 2009

(65) Prior Publication Data

US 2009/0124716 A1   May 14, 2009

Related U.S. Application Data

(63) Continuation of application No. 10/515,012, filed as application No. PCT/CZ02/00055 on Oct. 16, 2002, now Pat. No. 7,491,751.

(30) Foreign Application Priority Data

May 23, 2002   (CZ)   .......................... PV 2002-1799

(51) Int. Cl.
*C08G 63/00* (2006.01)
*C08G 63/02* (2006.01)

(52) U.S. Cl. .................. 528/272; 264/176.1; 264/219; 524/94; 524/381; 524/404; 525/418; 525/437; 525/438; 525/444; 525/464; 528/32; 528/35; 528/271; 528/480

(58) Field of Classification Search .............. 264/176.1, 264/219; 524/94, 381, 404; 525/418, 437, 525/438, 444, 464; 528/32, 35, 271, 272, 528/480

See application file for complete search history.

(56) References Cited

U.S. PATENT DOCUMENTS

| 4,048,103 | A | 9/1977 | Graham |
| 4,305,864 | A | 12/1981 | Griffin et al. |
| 5,395,858 | A | 3/1995 | Schwartz, Jr. |
| 5,432,006 | A | 7/1995 | Kessel et al. |
| 5,563,222 | A | 10/1996 | Fukuda et al. |
| 5,580,905 | A | 12/1996 | Schwartz, Jr. |
| 5,876,644 | A | 3/1999 | Nichols et al. |
| 2002/0006487 | A1 | 1/2002 | O'Connor et al. |

FOREIGN PATENT DOCUMENTS

| CZ | PV2001-926 | 11/2001 |
| EP | 0 794 216 A | 9/1997 |
| JP | 60245629 | 12/1985 |
| WO | WO 00 18830 A | 4/2000 |

OTHER PUBLICATIONS

International Search Report dated Apr. 29, 2003 issued in corresponding PCT/CZ/02/00055.
Ulrich B. Steiner and Camille Borer: "The Role of Additives in the Solid State Polycondensation of Recycled Polyethylene Terephthalate (PET)" in ARC '96 Technology The Spark in Recycling Publication, Nov. 7,8, 1996.

*Primary Examiner*—Terressa M Boykin
(74) *Attorney, Agent, or Firm*—Buchanan Ingersoll & Rooney PC

(57) ABSTRACT

A method for processing polyester wastes, especially used polyester bottles, which comprises shredding, washing, drying and melting the waste mixture to obtain a starting raw material wherein a modifying agent selected from the group comprising a combination of polysiloxane and a plasticizer selected from the group of phthalates, or a combination of silazanes and silanes is added to the shredded and dried waste mixture, the amount of the modifying agent being 4 to 6% by weight, based on the waste mixture.

11 Claims, No Drawings

METHOD FOR PROCESSING POLYESTER WASTE

TECHNICAL FIELD

The invention relates to a method for treatment of polyester materials preferably such as waste polyester containers wherein the waste mixture is crushed, washed, dried and melt to obtain a recovered source of polyester material. Said waste includes mostly the materials based on polyethylene terephthalate generally indicated also as PET and known from the packing technology for example as so called PET bottles. The final product to be used as recycled source of polyester material is mostly supplied in the form of granulates.

DESCRIPTION OF PRIOR ART

Polyester materials represent well known and widely used group of sound materials with proved hygienic properties used for example in packaging, picture or reproduction technology etc. Probably, the most widely used polyester material is polyethylene terephthalate (hereinafter referred to also as PET) and the used PET containers are the most common waste PET material to be recovered.

As ecologically most desirable method for disposal of used polyester containers is the recycling thereof with the effort to recover materials of adequate quality that may be used for the original purpose. The method of recovery treatment of said waste materials, for example used PET containers include several steps such as waste crushing, washing and subsequent drying the crushed material and melting and processing thereof to obtain granulate, which is the source polyester material for manufacturing new products—such packing, using extruders or injection molding machines. The manufacture of granulate is accompanied by undesirable phenomena such as oxidation and hydrolysis of polyester macromolecules what on the other hand may result in excess amount of rejects in processing such recycled source material or in final products of lesser quality. The unfavorable features of final products may be yellow tinge of moldings, enhanced penetrability for $CO_2$ of the recycled packing and moreover, increased contents of low molecular fractions including aldehyde in the recycled source of polyester material. Such fractions then pass from the raw material into the packing, product and deteriorate its quality.

To avoid such difficulties and to secure production of high quality food packing materials it was desirable to use other special methods that nevertheless mostly appeared to be complicated and in each case bringing about higher production cost.

For example, in the recycling process according to U.S. Pat. Nos. 5,395,858 and 5,580,905 polyesters are converted into the original chemical compounds. Polyester materials are mixed with an alkaline mixture and converted at higher temperatures to alkaline salts and then saponified. By this procedure various impurities and organic and inorganic compounds contained in the waste are removed. Nevertheless, this method requires rather complicated technology and high operating costs.

The Czech patent application PV 2001-926 describes a process for purifying crushed polyester material by heating it up in a water-free medium of alkaline mixture after having been first dried, in which process the polyester material is partially saponified without being melt what enables its subsequent physical clarifying and removing of impurities. This method includes of course a multi-stage process that is like in the previous case based on the application of alkaline materials in the form of alkaline hydroxides.

The object of the invention is to provide a method that would lead to a source of polyester material recovered from polyester waste that has been recycled specifically by crushing and following treatment of PET beverage containers, which material may be subsequently used for manufacture of high quality food package without the necessity to make use of complicated and expensive methods in production of recycled material.

SUMMARY OF INVENTION

The substantial feature of the method for treatment of polyester materials, specifically such as used polyester containers, according to the invention by which the waste mixture is crushed, washed, dried and melt to obtain a source of polyester material and which should eliminate certain problems of the prior art methods is that the mixture of crushed and dried waste polyester material is supplied by 4 to 6% by weight based on the total of the waste mixture of a modifying agent elected from the group comprising in combination a polysiloxane and a plasticizer elected from the group comprising phthlates, or in combination silazanes and silanes.

According to another feature of the invention the mixture of crushed and dried waste polyester material is supplied by 4 to 6% by weight based on, the total of the waste mixture of a modifying agent elected from the group comprising in combination polyhydrosiloxane and a plasticizer elected from the group comprising dioctylphthalate, dinonylphthalate, dibutylsebacinate or in combination hexamethyldisilazane and tetraethoxysilane.

According to still another feature of the invention the modifying agent contains 20 to 30% by weight of liquid polyhydrosiloxane and 70 to 80% by weight of a plasticizer elected from the group comprising dioctylphthalate, dinonylphthalate, dibutylsebacinate or 55 to 65% by weight of hexamethyldisilazane and 35 to 45% by weight of tetraethoxysilane.

The modifying agent may be added to the waste mixture in a reactor-mixer at temperature of 130±5° C. whereupon the waste mixture is subjected to stifling for 50 to 100 minutes.

Advantageously, the waste mixture is further processed at 240 to 250° C. to obtain a source of polyester material in the form of granulate.

As the result of using the method according to the invention the recycled waste polyester shows higher resistance of the source polyester against material destruction caused by oxidation and hydrolysis, while the other basic material parameters corresponding to the standard polyester are retained. This includes the removal of undesirable harmful fractions and lessening the penetration of gases with final products. Another advantage is that the entire production time is in comparison with similar processes reduced. The source of polyester material obtained by using the method according to the invention is contrary to common known types of such materials characterized by enhanced elasticity while maintaining its desired strength and further by its higher heat stability and higher crystallization temperature amounting up to 110° C.

DETAILED DESCRIPTION OF INVENTION

Example 1

10 kg of waste polyester bottles was crushed in a crusher rinsed in a washer and the waste mixture so obtained was dried in a dryer. The dried waste mixture was put into a reactor-mixer and heated up to 130±5° C. At this temperature 400 g of a modifying agent was added to the reactor. The modifying agent consisted of 25% by weight of liquid polyhydrosiloxane and 75% by weight of dioctylphthalate as plasticizer. Subsequently the mixture was stirred at this temperature for about 60 minutes. The received waste mixture was then processed at temperature of 240 to 250° C. in an extruder to produce the granulate. The resulting granulate was of dark gray color and characterized by high brightness.

Example 2

10 kg of waste polyester containers was crushed in a crusher, rinsed in a washer and the waste mixture so obtained was dried in a dryer. The waste mixture was put into a reactor-mixer and heated up to 130±5° C. At this temperature 400 g of a modifying agent was added to the reactor. The composition of the modifying agent was as follows: 60% by weight of hexamethyldisilazene and 40% by weight of tetraethoxysilane. Subsequently, the mixture was stirred at this temperature for about 60 minutes. The waste mixture received was then processed at temperature of 240 to 250° C. in an extruder to produce granulate. The resulting grate was clear and characterized by high brightness.

In comparison with the conventional products the recovered source of polyester materials have shown high elasticity while maintaining the required strength, higher heat stability and higher crystallization temperature—up to 110° C.

INDUSTRIAL APPLICABILITY

The method according to the invention may be used in the process of recycling polyester waste including without limitation so called PET bottles to receive a standard quality source material preferably usable for manufacture of food containers.

The invention claimed is:

1. A method for producing a modified polyester from waste processed polyester comprising:
   1) shredding, washing, and drying waste processed polyester;
   2) adding a modifying agent mixture consisting essentially of:
      a) 20 to 30% by weight liquid polyhydrosiloxane; and
      b) 70 to 80% by weight of a plasticizer selected from the group consisting of dioctylphthalate, dinonylphthalate, and dibutylsebacate;
   wherein the modifying agent mixture is added in an amount of 4% to 6% by weight of the waste processed polyester;
   3) heating the resulting mixture to obtain a melt; and
   4) recovering a modified polyester.

2. The method of claim 1, wherein the modifying agent mixture is added to the waste polyester at about 130° C., and the obtained polyester mixture is stirred for 50 to 100 minutes.

3. The method of claim 2, wherein the polyester mixture is further heated to 240 to 250° C. to obtain a modified polyester.

4. The method of claim 3, wherein the modified polyester is further processed to obtain a granulate.

5. A method for producing a modified polyester from waste processed polyester comprising:
   1) shredding, washing and drying waste processed polyester material;
   2) adding a modifying agent mixture comprising:
      a) 55 to 65% by weight hexamethyldisilazane; and
      b) 35 to 45% by weight tetraethoxysilane;
   wherein the modifying agent mixture is added in an amount of 4% to 6% by weight of the waste polyester;
   3) heating the resulting mixture to obtain a melt; and
   4) recovering a modified polyester.

6. The method of claim 5, wherein the modifying agent mixture is added to the waste polyester at about 130° C., and the obtained polyester mixture is stirred for 50 to 100 minutes.

7. The method of claim 6, wherein the melt is obtained by heating the polyester mixture to 240-250° C.

8. The method of claim 7, wherein the modified polyester is further processed to obtain a granulate.

9. The method of claim 1, wherein the resulting modified polyester has a crystallization temperature of about 110° C.

10. The method of claim 5, wherein the resulting modified polyester has a crystallization temperature of about 110° C.

11. A method for producing a modified polyester from waste processed polyester comprising:
   1) shredding, washing, and drying waste processed polyester;
   2) adding a modifying agent mixture consisting essentially of a) a combination of 20 to 30% by weight polyhydrosiloxane and 70 to 80% by weight of a plasticizer selected from the group consisting of dioctylphthalate, dinonylphthalate, and dibutylsebacate; or b) a combination of 55 to 65% by weight hexamethyldisilazane and 35 to 45% by weight tetraethoxysilane;
   wherein the modifying agent mixture is added in an amount of 4% to 6% by weight of the waste processed polyester;
   3) heating the resulting mixture to obtain a melt; and
   4) recovering a modified polyester.

* * * * *